United States Patent
Sreerama et al.

(10) Patent No.: US 10,073,807 B2
(45) Date of Patent: Sep. 11, 2018

(54) LOGIC-BASED DECODER FOR CROSSTALK-HARNESSED SIGNALING

(71) Applicant: Intel Corporation, Santa Clara, CA (US)

(72) Inventors: Chaitanya Sreerama, Santa Clara, CA (US); Stephen H. Hall, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 107 days.

(21) Appl. No.: 14/955,043

(22) Filed: Dec. 1, 2015

(65) Prior Publication Data

US 2017/0154007 A1    Jun. 1, 2017

(51) Int. Cl.
| | |
|---|---|
| *G06F 13/36* | (2006.01) |
| *G06F 13/38* | (2006.01) |
| *G06F 13/40* | (2006.01) |
| *G06F 13/42* | (2006.01) |
| *G06F 15/78* | (2006.01) |

(52) U.S. Cl.
CPC ...... *G06F 13/4282* (2013.01); *G06F 13/4022* (2013.01); *G06F 13/4234* (2013.01); *G06F 15/7817* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | | |
|---|---|---|---|---|
| 6,606,678 | B1* | 8/2003 | Nakamura | G06F 13/4059 710/305 |
| 2002/0024455 | A1* | 2/2002 | Abbiate | H03M 5/16 341/57 |
| 2003/0001768 | A1* | 1/2003 | Bult | H03F 3/70 341/162 |
| 2010/0254467 | A1 | 10/2010 | Braun et al. | |
| 2012/0063291 | A1* | 3/2012 | Hsueh | H04B 1/7097 370/201 |
| 2014/0181348 | A1 | 6/2014 | Oluwafemi et al. | |
| 2014/0355407 | A1 | 12/2014 | Cronie | |
| 2015/0092532 | A1* | 4/2015 | Shokrollahi | H04L 1/0056 370/216 |

OTHER PUBLICATIONS

International Search Report and Written Opinion dated May 3, 2017 for International Application No. PCT/US2016/067502, 10 pages.

* cited by examiner

*Primary Examiner* — David E Martinez
(74) *Attorney, Agent, or Firm* — Alliance IP, LLC

(57) ABSTRACT

A logic-based decoder recovers binary data from ternary Crosstalk-Harnessed Signaling (CHS) streams with lower part cost, complexity and power consumption than analog/digital converter (ADC)-based CHS decoders. The decoders use inverters, latches, gates, latching circuits, and one comparator per bit pair to carry out the decoding calculations to produce a reconstructed binary signal with very low crosstalk noise that is largely insensitive to routing density. System-on-chip, multi-chip package, printed circuit board, and wired network applications are discussed.

4 Claims, 8 Drawing Sheets

LOGIC-BASED DECODER FOR CROSSTALK-HARNESSED SIGNALING

FIELD

Related fields include signal integrity in digital communication and more particularly reducing signal degradation from crosstalk as signaling speeds and routing densities increase.

BACKGROUND

Modern computing devices incorporate a growing number of components into progressively smaller device housings. As device sizes decrease, the data buses between components must be routed more densely. When increased routing density is combined with increased bandwidth demand, noise from crosstalk between signal lines of the data bus, particularly differential signal lines, becomes a limiting factor in bus performance. In some scenarios, crosstalk noise may limit the data rate at which a data bus can successfully transfer data between components.

One way of reducing crosstalk in a data bus is to increase the signal line spacing, which limits the degree of miniaturization that can be achieved. Adding an extra layer and moving some of the interconnects to that extra layer may reduce crosstalk while allowing more miniaturization. However, this approach may be costly. Some crosstalk noise may be equalized at the receiver, but the components may be costly and power-consuming.

Many of the new miniature devices are intended for mobile use; thus power conservation (e.g., battery life) joins high bandwidth and small size as a top priority. Thus, a need exists for an effective solution that reduces crosstalk in small and miniature-sized devices. The present disclosure addresses this need.

DETAILED DESCRIPTION

Crosstalk-harnessed signaling (CHS) removes a fundamental limitation of high-speed digital bus design by eliminating or significantly reducing the effects of crosstalk noise between differential pairs of lines. Each of the components connected by a data bus may include an Input/Output (I/O) transmitter with an encoding block and an I/O receiver with a decoding block. The encoded, non-binary CHS signal spreads the information from each binary bit across multiple signal lines in such a way that any crosstalk that may occur will effectively become part of the signal. The binary data recovered during the decode process shows little or no negative effects of crosstalk compared to data sent over the same type of line in its binary form. More detailed explanation of CHS encoding may be found in co-owned U.S. Pat. App. Pub. Nos. US2014/0181348 A1 and US2014/0181358 A1, which are incorporated herein by reference in their entirety.

Opportunities remain to reduce cost, complexity and power consumption in CHS links.

The following terms shall have the following meanings for purposes of this document:

Connected: in direct physical or electrical contact with each other.

Coupled: co-operating or interacting with each other whether or not in direct physical or electrical contact with each other.

CHS techniques provide significant increases in both routing density and bus speeds for packages, printed circuit boards (PCBs), multi-chip modules (MCMs) and multi-chip packages (MCPs). Increasing the routing density and bus speed enables more functionality to fit in a smaller package volume, facilitating continued scaling of computer performance.

Some existing CHS receivers use analog to digital converters (ADCs) to sample the encoded CHS data stream during the decoding process. ADCs consume an amount of power consistent with their performing hundreds of comparator operations per signal. ADCs are designed for faithful reproduction of analog signals with potentially wide dynamic or frequency ranges. CHS encoded signals are more complex than binary signals, but they are nevertheless digital; some embodiments only use a small fraction of the ADC's capabilities. Therefore, simpler components that consume less power than an ADC may nevertheless produce satisfactory results in a CHS decoder.

A low-power logic-based CHS decoder uses logic circuits to "deduce" the original binary bit values by sampling the encoded signal at strategic levels and applying inverse mathematical processes derived from the known encoding equations to recover the binary signal. Additionally, instead of the 4-bit "nibble" processing that may be used in embodiments of the ADC-based decoders, the logic-based decoders may use a 2-bit decoding process. Parallel processing with multiple decoders is possible with either solution; processing a byte at a time could be achieved with four logic-based decoders alternatively to two ADC-based decoders.

Figure 1A:
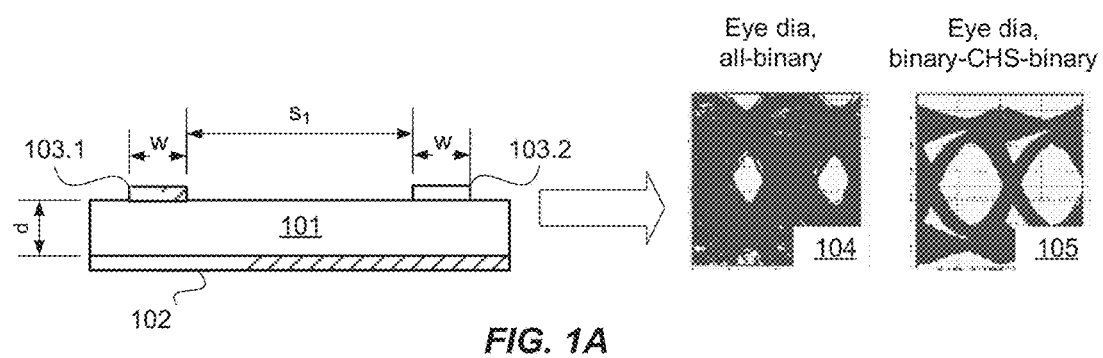
FIGS. 1A-1C are dimensioned drawings of differential signal-line pairs and reproductions of corresponding eye diagrams for binary and CHS signaling.
Figure 1B:
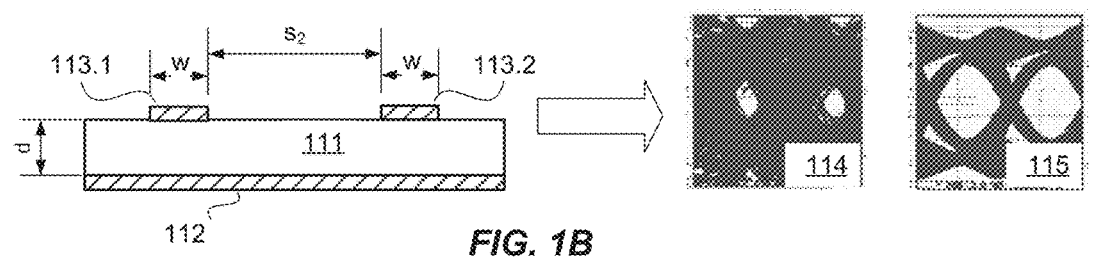
Figure 1C:
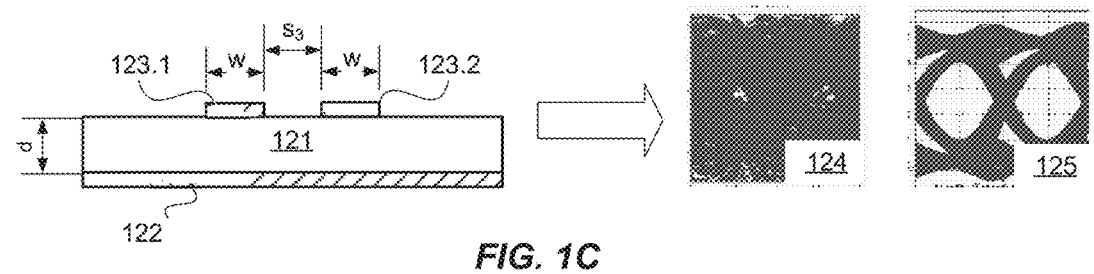

FIGS. 1A-1C are dimensioned drawings of differential signal-line pairs and reproductions of corresponding eye diagrams for binary and CHS signaling. Traditional binary crosstalk-limited buses comprising microstrip traces were routed at different trace spacings for a length of 127 mm (5 inches) and a data rate of 8 Gb/s. In FIGS. 1A-1C, trace width "w" for traces 103.1, 103.2, 113.1, 113.2, 123.1 and 123.2 is about 0.1 mm (4 mils). Thickness "d" of a substrate (e.g., a composite PCB substrate with optional grounding planes 102, 112, 122) may also be about 0.1 mm (4 mils).

In FIG. 1A, spacing S1 between traces 103.1 and 103.2 is 0.4 mm (16 mils). Both the binary-transmission eye diagram 104 and the CHS-encoded-transmission eye diagram 105 are open, but diagram 105 is more open than diagram 104, suggesting that even at this wide trace spacing, CHS transmission will have a lower bit-error rate than binary transmission.

In FIG. 1B, spacing S2 between traces 113.1 and 113.2 is 0.3 mm (12 mils). The binary-transmission eye diagram 114 is only barely open. However, the CHS-encoded-transmission eye diagram 115 is, to the unaided eye, visually identical to diagram 105 (see FIG. 1A), suggesting that the bit-error rate has not increased or, conservatively, may have increased by less than a few percent.

In FIG. 1C, spacing S3 between traces 123.1 and 123.2 is 0.1 mm (4 mils). The binary-transmission eye diagram 124 is closed, suggesting a bit-error rate that may be unacceptable. However, the CHS-encoded-transmission eye diagram 125 is, to the unaided eye, visually identical to diagram 105 (see FIG. 1A), suggesting that the bit-error rate has not increased or, conservatively, may have increased by less than a few percent.

As the trace spacing was reduced from 0.4 mm (16 mils) to 0.1 mm (4 mils), the binary-transmission eye diagram completely closes, indicating that this bus may produce an unacceptably high bit-error rate. By contrast, the CHS eye diagrams are wide open and almost independent of the trace spacing at this scale. For this reason, CHS holds promise for implementing denser routines in crosstalk-limited high-speed architectures with other materials and dimensions as well.

Figure 2:
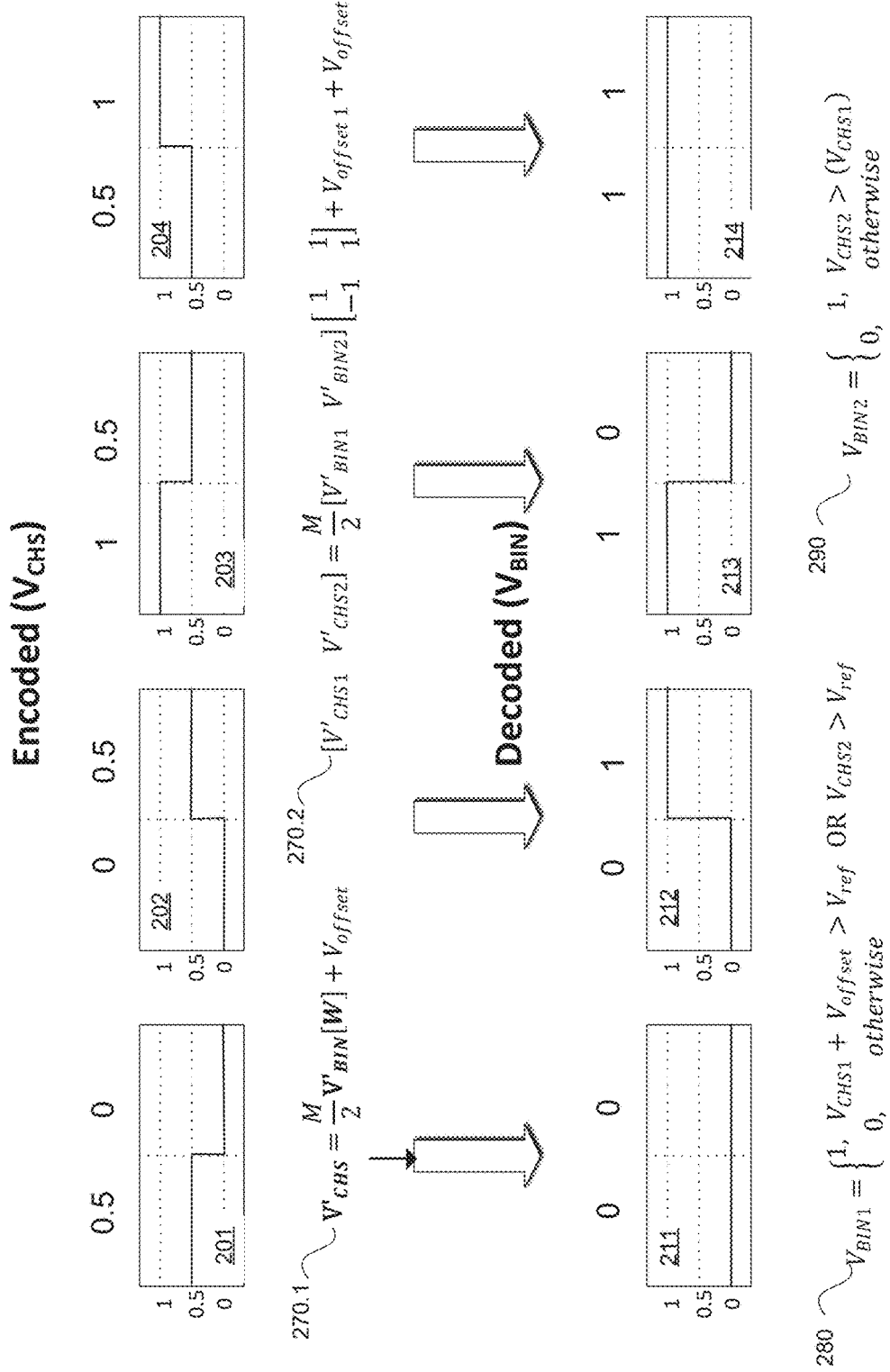
FIG. 2 illustrates ternary CHS-encoded signals and corresponding decoded binary signals.

FIG. 2 illustrates ternary CHS-encoded signals and corresponding decoded binary signals. Ternary (3-level) CHS operates on pairs of bits, unlike quaternary (4-level) CHS which operates on "nibbles" (groups of 4 bits). For simplicity, these examples involve ternary CHS, but they do not preclude logic-based decoders being adapted for quaternary or higher-order CHS.

CHS bit pairs 201, 202, 203, and 204 demonstrate that a ternary CHS bit may have one of three voltage levels: a minimum, a maximum, and an intermediate. In some embodiments, the intermediate may be halfway between the minimum and the maximum.

As shown by the encoding eq. 270.1, the vector $V'_{CHS}$ representing the CHS bit pair exiting the transmitter is a product of the vector $V'_{BIN}$ representing the binary bit pair entering the decoder, a weighted matrix W (which is a 2×2 matrix in the case of ternary CHS) and a normalizing factor of ½. In some embodiments, a multiplier M may be applied to the CHS signal before transmission to limit the excursion from minimum to maximum to a desirable range. In some embodiments, an offset $V_{offset}$ may be added to the (multiplied, if applicable) CHS signal before transmission to force all three levels to have the same polarity (e.g., $V_{offset}$ may raise the minimum to >=0 to make all levels positive or $V_{offset}$ may lower the maximum to <=0 to make all levels negative). As a non-limiting example, a multiplier M and/or an offset $V_{offset}$ may be used to cause the CHS signal to be within a range from 0 to 1V. $V_{offset}$ may be, for example, a value between 0V and 1V, such as 0.5V (e.g., $V_{offset}=[V_{offset1}=V_{offset2}]=[0.5V\ 0V]$). If the encoded CHS signal is transmitted "as-is," M=1 and $V_{offset}=0$.

The other encoding eq. 270.2, is an expanded version of encoding eq. 270.1 to explicitly show how each bit value in the vector $V'_{CHS}$ depends on both bit values in the vector $V'_{BIN}$. These 2-to-2 (or, more generally, many-to-many) relationships in CHS encoding produce non-binary bit streams that are virtually immune to crosstalk that may occur between neighboring differential signal lines.

Binary bit pairs 211, 212, 213 and 214 are recovered from CHS bit pairs 201, 202, 203 and 204 respectively by reversing the encoding process: subtracting $V_{offset}$, multiplying by 2, optionally dividing by M and multiplying the CHS bit values by using a digital decoder that can be expressed using decoding eqns. 280 and 290: simple thresholding expressions involving sums. Threshold voltage $V_{ref}$ may be between the CHS ternary intermediate and maximum levels. Any of a range of $V_{ref}$ values between those two levels may work, which may lend flexibility to the design of logic-based encoders.

Figure 3:
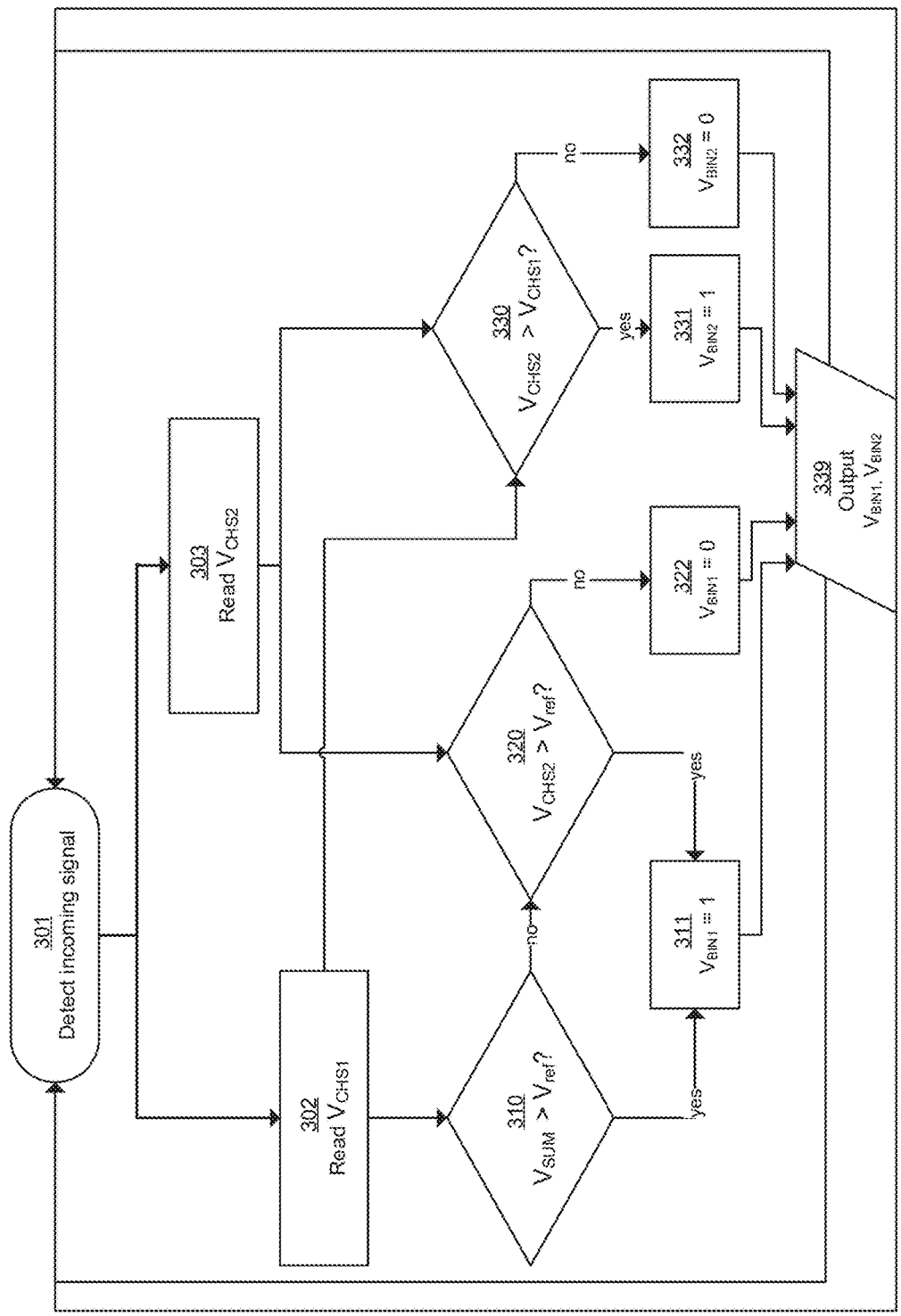
FIG. 3 is a flowchart of a process for reading incoming ternary CHS bit pairs and decoding them to recover the original binary bit pairs.

FIG. 3 is a flowchart of a process for reading incoming ternary CHS bit pairs and decoding them to recover the original binary bit pairs. This process is set up to perform multiple operations in parallel as one possible way to optimize processing speed. Other orders of the pictured steps and the addition of intermediate steps between the pictured steps, may also be incorporated within this disclosure.

For this process, $V_{ref}$ and $V_{offset}$ may be stored constants.

At step 301, the decoder detects incoming CHS signals from the receiver. At step 302, the decoder reads/measures $V_{CHS1}$. At step 303, the decoder reads/measures $V_{CHS2}$. In some embodiments, two different sensors in the decoder may be deployed to read/measure $V_{CHS1}$ and $V_{CHS2}$ in parallel. At decision 310, if $V_{CHS1}>V_{ref}$, the decoder sets $V_{BIN1}=1$ at step 311. If not, the decoder goes to decision 320. At decision 320, if $V_{CHS2}>V_{ref}$, the decoder sets $V_{BIN1}=1$ at step 311. If not, the decoder sets $V_{BIN1}=0$ at step 322. At decision 330, if $V_{CHS2}>V_{CHS1}$, the decoder sets $V_{BIN2}=1$ at step 331. If not, the decoder sets $V_{BIN2}=0$ at step 332. The decoder outputs $V_{BIN1}$ and $V_{BIN2}$ at step 339 and returns to step 301 to detect the next CHS bit pair.

One aspect of the process that this type of chart clarifies is that there are at least two different options for logic hardware to perform the two comparisons that determine the value of $V_{BIN1}$ based on the value of $V_{ref}$. In FIG. 3, $V_{BIN1}=1$ if decision 310="yes" or alternatively if decision 320="yes." On the other hand, $V_{BIN1}=0$ if decision 310="no" and if decision 320 also="no." Therefore, some embodiments of the logic circuit of the logic-based decoder for ternary CHS signals may include an OR gate and some embodiments may include an AND gate.

Figure 4A:
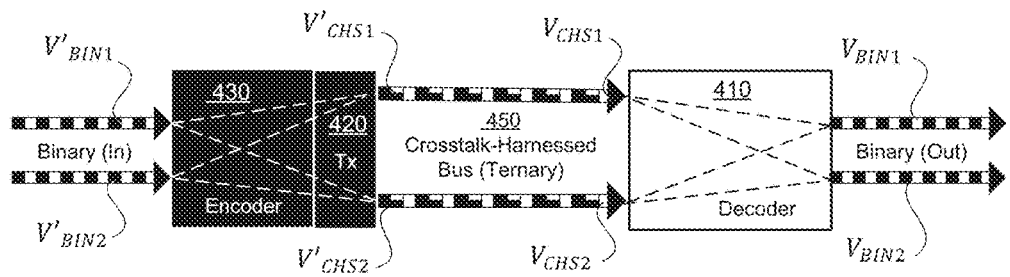
FIGS. 4A and 4B illustrate a ternary CHS link and a decoder logic circuit with an OR gate.
Figure 4B:
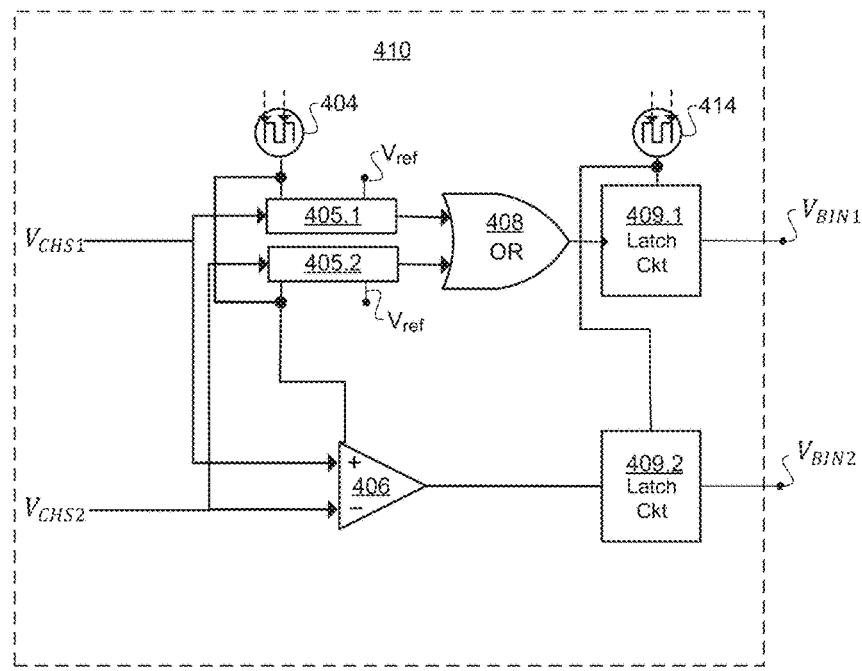

FIGS. 4A and 4B illustrate a ternary CHS link and a decoder logic circuit with an OR gate.

In FIG. 4A, a first pair of binary signals $V'_{BIN1}$ and $V'_{BIN2}$ enter an encoder 430 before being transmitted. Encoder 430 uses aspects of both of the binary signals $V'_{BIN1}$ and $V'_{BIN2}$ to construct each of a first pair of CHS ternary signals. The ternary signals are input to digital transmitter 420, which sends them into a first end of crosstalk-harnessed bus 450 as $V'_{CHS1}$ and $V'_{CHS2}$. For example, crosstalk-harnessed bus 450 may include a differential pair of signal lines carrying $V'_{CHS1}$ and $V'_{CHS2}$.

At a second end of the crosstalk-harnessed bus 450, CHS ternary output signals $V_{CHS1}$ and $V_{CHS2}$ are received by digital receiver 410. $V_{CHS1}$ and $V_{CHS2}$ are essentially the inputs $V'_{CHS1}$ and $V'_{CHS2}$ convolved with the impulse response of crosstalk-harnessed bus 450. In the digital decoder 410, $V_{CHS1}$ and $V_{CHS2}$ are used as inputs to decoder 410 and the decoder 410 recovers binary signals $V_{BIN1}$ and $V_{BIN2}$. $V_{BIN1}$ and $V_{BIN2}$ are preferably a very close match for $V'_{BIN1}$ and $V'_{BIN2}$, with any artifacts added by encoding, transmission and decoding being too minor to affect the bit error rate. Digital decoder 410 uses aspects of both of the CHS ternary signals $V_{CHS1}$ and $V_{CHS2}$ to recover each of the pair of binary signals $V_{BIN1}$ and $V_{BIN2}$.

FIG. 4B illustrates more details of digital decoder 410 shown in FIG. 4A. Ternary signals $V_{CHS1}$ and $V_{CHS2}$ exit the crosstalk-harnessed bus 450, so that the logic deriving $V_{BIN2}$ (bottom section of decoder logic circuit 410) and the logic deriving $V_{BIN1}$ (top section of decoder logic circuit 410) have parallel access to $V_{CHS1}$ and $V_{CHS2}$.

$V_{BIN2}$ may be recovered by applying the decoding eq. 290, which involves comparing $V_{CHS1}$ and $V_{CHS2}$. If $V_{CHS2} > (V_{CHS1})$, then $V_{BIN2}=1$; otherwise $V_{BIN2}=0$. Comparator 406, connected the digital or sampled output of $V_{CHS1}$ and $V_{CHS2}$ sends comparison results to latching circuit 409.2, which outputs $V_{BIN2}$.

$V_{BIN1}$ may be recovered by applying the decoding eq. 280, which assigns a value of 1 to $V_{BIN1}$ if either one of two conditions is fulfilled. Latch 405.1, which receives input from a digital or sampled output of $V_{CHS1}$ and $V_{CHS2}$, has a threshold voltage $V_{ref}$ (e.g., 0.6V or elsewhere in the range between 0.55V and 0.95V). Latch 405.2 receives input from a branch of splitter 403.2, has a threshold voltage $V_{ref}$ that is the same as, or very close e.g. within +/−20% of, the $V_{ref}$ of latch 405.1. Latches 405.1 and 405.2 each produce a digital output of 1 if the input voltage exceeds $V_{ref}$; OR gate 408 produce a digital output of 1 if the input from either of the latches=1.

The latches and the OR gate consume very little power; while the comparator is the dominant power consumers in the decoder logic circuit of FIG. 4B. This circuit uses only one comparator per bit pair—much less than, for example, a 6-bit ADC exercising as many as 63 comparators per bit.

Logic-based decoder 410 also includes latching circuits 409.1 and 409.2, one per bit, first clock sample signal 404 and second clock sample signal 414 to keep the bits synchronized. However, none of these consume as much power as an ADC converter.

In some embodiments, clock sample 404 may be a rising-edge sample and clock sample 414 may be a falling-edge sample, of the same clock, such as a system clock. Clock sample 404 latches incoming data to the inputs of decoder 410, whereas clock sample 414 latches outgoing data to the outputs of decoder 410.

Figure 5:
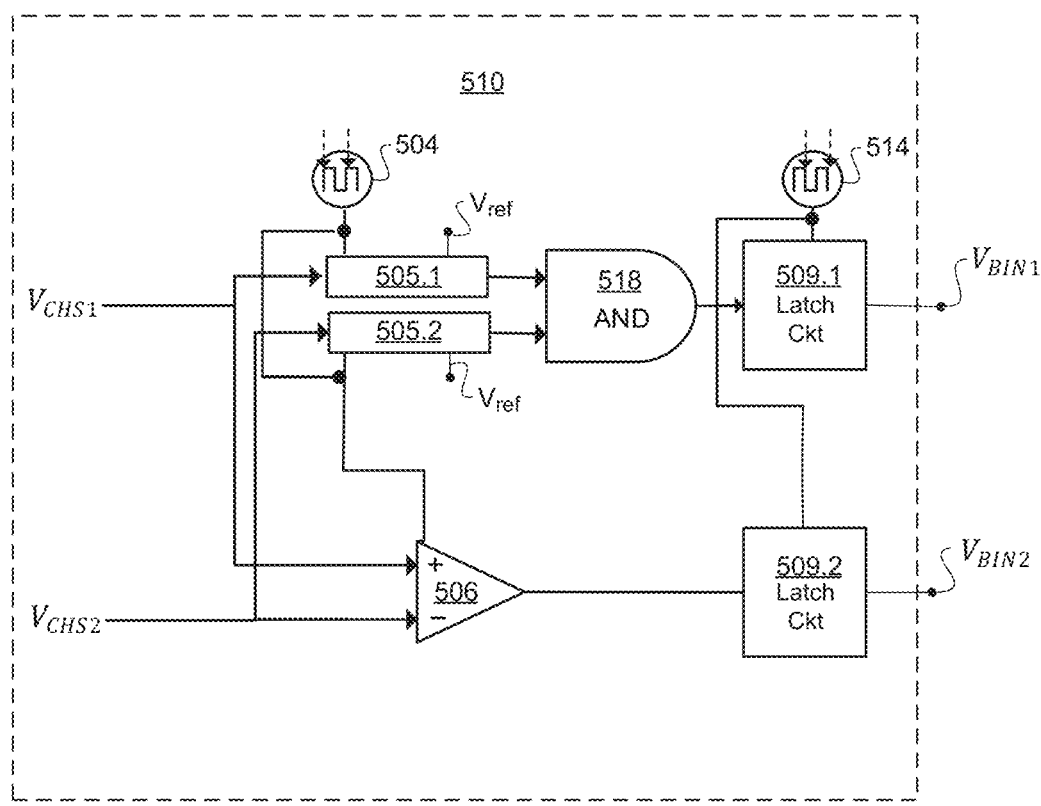
FIG. 5 is a schematic diagram of a logic-based decoder using an AND gate.

FIG. 5 is a schematic diagram of a logic-based decoder 510 using an AND gate. The Eq. 290, the decoding equation for $V_{BIN2}$, is the same for this circuit as it was for the circuit of FIG. 4B. The bottom part of the circuit, which produces the $V_{BIN2}$ result, is also unchanged from FIG. 4B. In FIG. 5, input $V_{CHS2}$ goes into two branches. One of the branches goes to comparator 506 where its signal is compared with the $V_{CHS1}$ signal. The comparison results are sent to latching circuit 509.2, which yields the recovered $V_{BIN2}$ value.

Eqn. 580 is the decoding equation for $V_{BIN1}$. It produces the same decoding results as eqn. 280 (see FIGS. 2 and 4B), but expresses the conditions in terms of "and" instead of "or" based on the threshold voltage $V_{ref}$. When the possible results are limited to 0 or 1, as they may be when reconstructing binary bit-values, "Result=1 if A is above the threshold and B is above the threshold otherwise Result=0." However, such alternate expressions may indicate alternatives in component choices for a logic circuit, depending on which expression is implemented in the hardware.

Latch 505.1, which receives a signal $V_{CHS1}$, feeds its output into AND gate 518. Latch 505.2, which receives a signal from $V_{CHS2}$, feeds its output into AND gate 518. The output of AND gate 518 is sent to latching circuit 509.1, which produces the binary bit value $V_{BIN1}$.

Another dissimilarity between this circuit and that of FIG. 4B, besides the type of gate, is the threshold voltage $V_{ref}$ for latches 505.1 and 505.2. To test the "less than or equal to" expressions of eqn. 580, $V_{ref}$ is chosen to be in a voltage range between the minimum and intermediate values of $V_{CHS1}$ and $V_{CHS2}$. For example, if the minimum is 0 V and the intermediate value is 0.5 V, $V_{ref}$ may be in a range between 0.05 V and 0.45 V, for instance 0.3 V.

Figure 6:
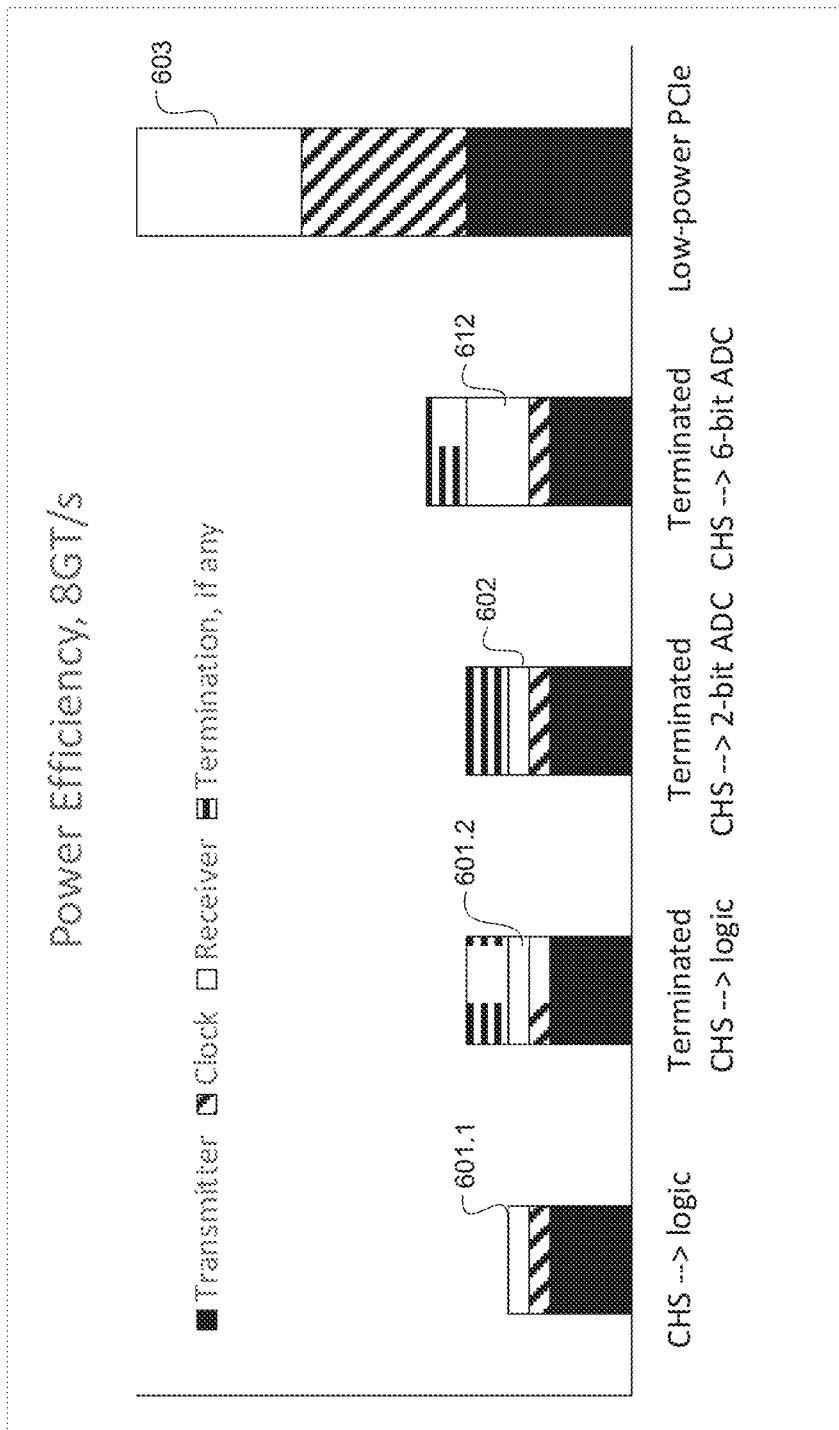
FIG. 6 illustrates some comparative data for logic-based decoders, other decoders, and other link types.

FIG. 6 illustrates some comparative data for logic-based decoders, other decoders, and other link types. The data most relevant to this disclosure is the power consumed by receivers, which include decoders (illustrated as the white sections of the stacked columns). The logic-based decoder (CHS→logic) has low receiver power consumption 601.1. Termination does not seem to change the receiver power consumption 601.2 of the logic-based decoder. The terminated CHS→2-bit ADC decoder has receiver power consumption 602 comparable to logic-based decoder consumption values 601.1 and 601.2. The terminated CHS→2-bit ADC decoder consumes about the same amount of power 602 as the logic-based decoder. By contrast, the 6-bit ADC decoder consumes power 612, about 3-4× more than the logic-based decoder. A binary low-power PCIe receiver without encoding or decoding consumes about 8× the power of the logic-based decoder.

Figure 7:
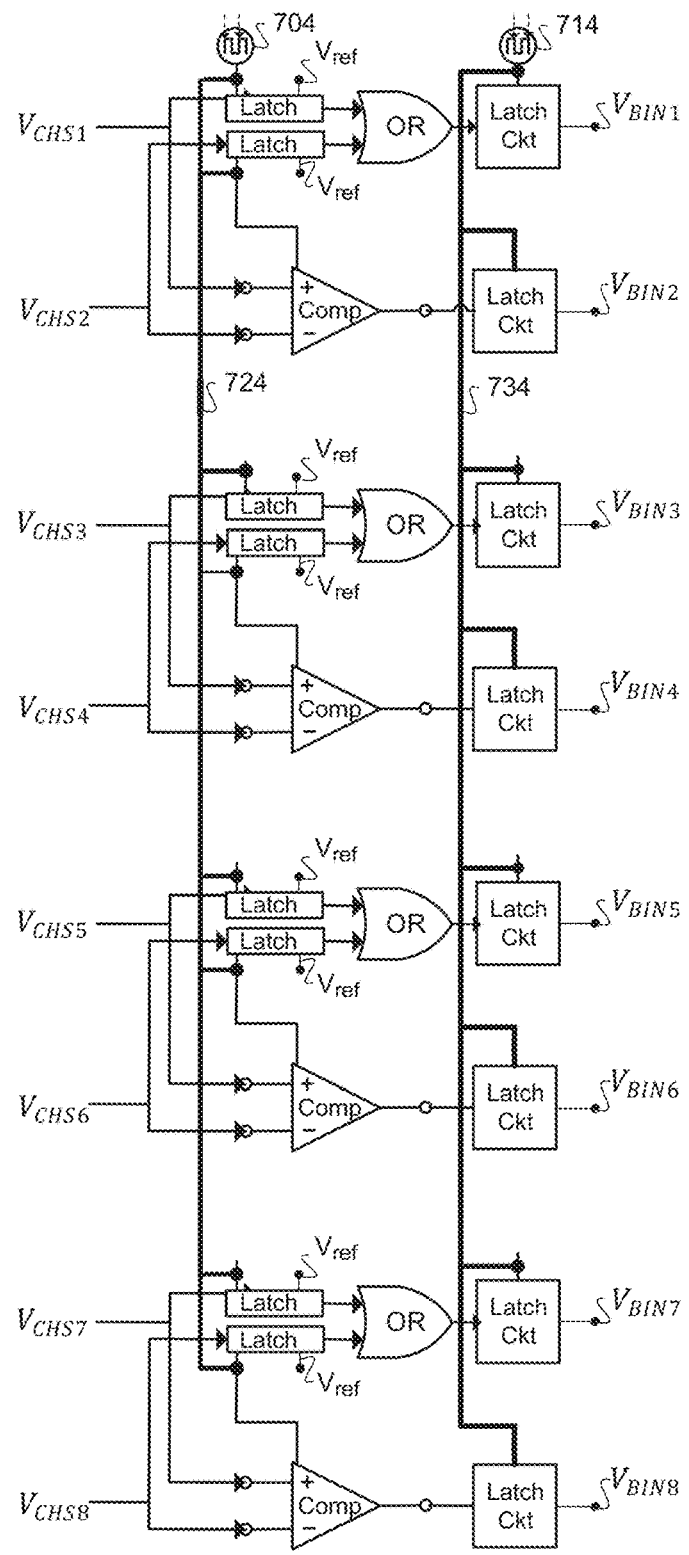
FIG. 7 is a schematic of four logic-based decoders coupled in parallel.

FIG. 7 is a schematic of four logic-based decoders coupled in parallel. With each of the decoders decoding a bit pair at a time, this parallel 4-decoder arrangement may decode a byte (4 bit pairs) of ternary CHS data at a time. All of the decoders are synchronized to the same clock-H sample 704 and clock-L sample 714.

Figure 8:
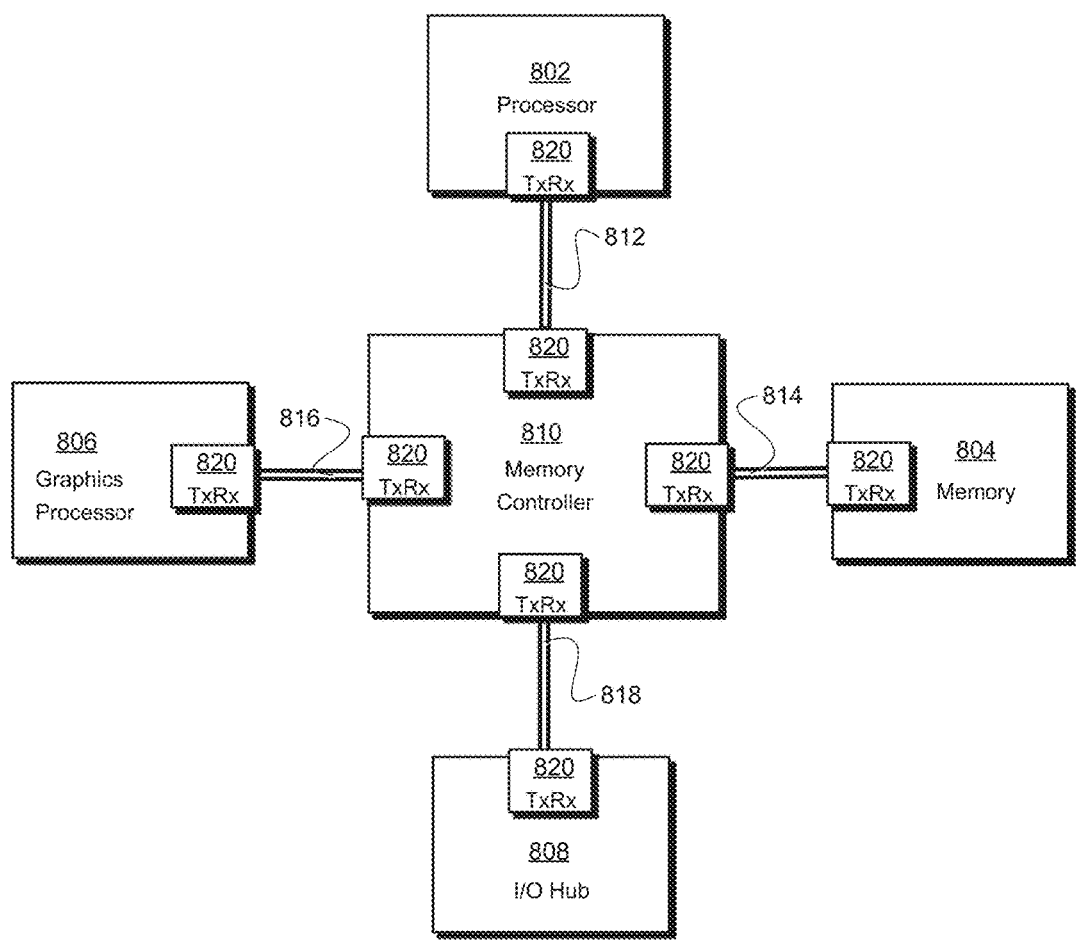
FIG. 8 is a block diagram of an example of a computing system with a signaling module that reduces crosstalk.

FIG. 8 is a block diagram of an example of a computing system with a signaling module that reduces crosstalk. The computing system may be, for example, a mobile phone, laptop computer, Ultrabook, desktop computer, server or tablet computer, among others. The computing system may include a processor 802 that is adapted to execute stored instructions, as well as a memory device 804 that stores instructions that are executable by the processor 802. The processor 802 can be a single core processor, a multi-core processor, a computing cluster or any number of other configurations. The processor 802 may be implemented as Complex Instruction Set Computer (CISC) or Reduced Instruction Set Computer (RISC) processors, x86 Instruction set compatible processors, multi-core or any other microprocessor or central processing unit (CPU). In some embodiments, the processor 802 includes dual-core processor(s), dual-core mobile processor(s) or the like.

The memory device 804 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory or any other suitable memory systems. The memory device 804 can be used to store computer-readable instructions that, when executed by the processor, direct the processor to perform various operations in accordance with embodiments described herein.

The computing system may also include a graphics processor 806 that processes computer generated graphics. The graphics processor 806 is configured to process memory related to the generation of graphics to be sent to a display (not shown). The display may be a built-in component of the computing system externally connected to the computing system. The computing system can also include an I/O hub 808 used to connect and control additional I/O devices (not shown), such as network interface controllers, memory storage devices, user input devices, among others. The I/O devices coupled to the I/O hub 808 may be built-in components of the computing system or may be devices that are externally connected to the computing system.

The computing system may also include a memory controller hub 810 that handles communications between the processor 802, memory 804, graphics processor 806 and I/O hub 810. Communications between the various components of the computing system can be performed over various data buses. For example, the graphics processor 806 can be coupled to the memory controller 810 through a graphics bus 816. The memory 804 can be coupled to the memory controller 810 through a memory bus 814. The data bus between the processor 802 and the memory controller 810 may be referred to as the front side bus 812. The data bus between the memory controller 810 and the I/O hub may be referred to as the internal bus 818. Memory controller may include a memory element (not shown).

In some embodiments, the processor 802, graphics processor 806, memory device 804, memory controller 810 and I/O hub 808 may be separate integrated circuit chips coupled to a mother board. In some embodiments, one or more of the processor 802, the graphics processor 806, the memory device 804, the memory controller 810 and the I/O hub 808 may be included in a multi-chip module (MCM), multi-chip package (MCP) or system-on-a-chip (SOC). Depending on the design considerations of a particular implementation, the signal lines of the one or more of the buses 812, 814, 816, 818 may disposed, at least in part, on one or more circuit boards.

The computing system also includes signaling modules 820 that facilitate digital communications between the components coupled to the respective bus. Each signaling module 820 receives digital data and generates signals that propagate on the signal lines of the various buses. As explained further below, the signals are encoded by a transmitting signaling module and decoded by a receiving signaling module in a way that reduces the effects of crosstalk between the signal lines of the data bus. A respective signaling module 820 may be coupled to or included in, any component of the computing device 800 that transmits data over a data bus that uses differential communications. For example, signaling modules may be included in the processor 802, graphics processor 806, memory device 804, memory controller 810 and I/O hub 808, among others.

The block diagram of FIG. 8 is not intended to indicate that computing systems must include all of the components shown. Rather, the computing system can include fewer or additional components not illustrated in FIG. 8. Furthermore, the components may be coupled to one another according to any suitable system architecture, including the system architecture shown in FIG. 8 or any other suitable system architecture that uses a data bus to facilitate communications between components. For example, embodiments of the present techniques can also be implemented any suitable electronic device, including ultra-compact form factor devices, such as System-On-a-Chip (SOC) arrangements in which all the components are formed on a single integrated chip and multi-chip modules where some of the components may be on different chips mounted on a PCB or other substrate. Signal lines may include stripline, microstrip, PCIe or any other suitable type. The buses 812-818 in FIG. 8 could also be any electrical cable inside or outside of a computer that carries digital information from one point to another. For example, embodiments of logic-based CHS decoders may be used for connecting disk drives or other peripherals, as well as networked desktop computers.

These low-power CHS decoders are expected to significantly reduce the negative impact of crosstalk noise in high-speed buses. For example, some embodiments may:

(1) Facilitate major increases in microstrip bus speed and routing density by mitigating or obviating the historical crosstalk-noise penalty.

(2) Decrease bill-of-materials (BOM) cost by tolerating higher routing density and thereby opening up design options such as smaller packages and fewer interconnect layers.

(3) Increase the maximum computational capability possible in a small volume chassis by supporting increased routing density.

(4) Accelerate commercialization emerging package technologies with finer I/O lines In summary, passive test board measurements and simulations have both demonstrated that CHS mitigates or eliminates the increases in crosstalk noise associated with binary signaling at high bandwidth and high routing density. The logic-based CHS decoders described herein support high-density routing of high-speed signals with low power consumption without sacrificing performance. This technology has the potential to reduce system costs by reducing PCB, package or cable layers; reducing board areas and I/O counts; and creating opportunities to use smaller connectors.

The method allows for significant increases in both routing density and bus speeds on packages, printed circuit boards (PCBs), multi-chip modules (MCMs) and multi-chip packages.

Examples

Example 1 includes a computing system comprising a memory controller and a first communication link between the memory controller and at least one peripheral device. The communication link carries a crosstalk-harnessed signal (CHS). The CHS is a multi-level non-binary signal in one or more embodiments. The CHS is decoded to a binary signal by arithmetic logic coupled to a receiver. The arithmetic logic is to decode the CHS by sampling an encoded signal and recovering the binary signal based on the sampling.

In Example 2, the computing system in Example 1, can further comprise a processor, memory, and an input/output (I/O) hub. In addition, a second communication link between the memory controller and the memory; a third communication link between the memory controller and the I/O hub; and a fourth communication link between the memory controller and a graphics processor. The at least one of the second communication link, the third communication link, or the fourth communication link carries and additional CHS.

In Example 3, the computing system in Example 2, wherein the processor, the graphics processor, the memory, the I/O hub, the memory controller, the first communication link, the second communication link, the third communication link, and the fourth communication link are formed on a single integrated chip.

In Example 4, the computing system in Example 2, wherein at least one of the processor, the graphics processor, the memory, the I/O hub, or the memory controller is formed on a different chip than at least a different one of the processor, the graphics processor, the memory, the I/O hub or the memory controller.

In Example 5, the computing system in Example 2, wherein at least one of the second communication link, the third communication link, or the fourth communication link that carries the additional CHS is formed as a conductive trace on a printed circuit board.

In Example 6, the computing system in Example 2, wherein at least one of the second communication link, the third communication link, or the fourth communication link that carries the additional CHS is formed as a cable-connecting separate device.

In Example 7, the computing system in Example 2, wherein the arithmetic logic employs a 2-bit decoding process.

In Example 8, the computing system in claim 1, wherein the first communication link carries a pair of crosstalk-harnessed signals and wherein the pair of crosstalk-harnessed signals is decoded to a pair of binary signals by the arithmetic logic, the arithmetic logic to decode the CHS by sampling the encoded signal and recovering at least one of the pairs of binary signals by using aspects of the pair of crosstalk-harnessed signals by comparing a first set of voltages associated with a first CHS of the pair of crosstalk-harnessed signals with a second set of voltages associated with a second CHS of the pair of crosstalk-harnessed signals or by comparing the first set of voltages and the second set of voltages with a reference voltage.

Example 9 includes a link comprising a crosstalk-harnessed bus having a first differential pair of signal lines. The link further comprises a digital transmitter coupled to a first end of the crosstalk-harnessed bus; a digital receiver coupled to a second end of the crosstalk-harnessed bus; and an encoder coupled to an input of the digital transmitter. The encoder comprises arithmetic logic to convert a pair of binary signals to a first pair of ternary signals based on a product of a first voltage vector ($V'_{BIN}$) representing a binary bit, a weighted matrix, a normalizing factor, and a multiplier. The link further comprises a first decoder logic circuit coupled to an output of the first differential pair of signal lines through the digital receiver.

In Example 10, the link in Example 9, wherein the digital transmitter is to transmit the first pair of ternary signals and the digital receiver is to receive the first pair of ternary signals.

In Example 11, the link in Example 9, wherein the first decoder logic circuit comprises a pair of latches, a comparator, and a gate.

In Example 12, the link in Example 9 further comprising at least a second pair of ternary signals transmitted in a second pair of differential signal lines; and at least a second decoder logic circuit coupled to the additional pair of differential signal lines through the digital receiver; wherein the first decoder logic circuit and the second decoder logic circuit work in parallel to convert the first pair of ternary signals and the second pair of ternary signals, respectively, to binary signals.

In Example 13, the link of Example 9 further comprising adding an offset to the product of the first voltage vector.

Example 14 includes a decoder comprising a first input for a first multi-level CHS and a second input for a second multi-level CHS. The decoder further comprises a first latch and a second latch having identical reference voltages; a comparator; and a gate coupled to an output of the first latch and an output of the second latch. Furthermore, the decoder comprises a first latching circuit coupled to an output of the gate and a second latching circuit coupled to an output of the comparator. Additionally, the decoder comprises a first clock sample signal coupled to the first latch, the second latch and the comparator and a second clock sample signal coupled to the first latching circuit and the second latching circuit.

In Example 15, the decoder in Example 14, wherein the first latching circuit and the second latching circuit are to produce binary output signals from inputs from the first multi-level CHS and the second multi-level CHS at the first latch, the second latch, and the comparator. The first multi-level CHS and the second multi-level CHS each comprises three or more voltage levels which have an identical polarity.

In Example 16, the decoder in Example 14, wherein one of the first clock sample signal and the second clock sample signal comprise at least one of a clock-high signal or a clock-low signal.

In Example 17, the decoder in Example 14, wherein the first clock sample signal and the second clock sample signal originate in at least one of a single clock or a system clock.

In Example 18, the decoder in Example 14, wherein the identical reference voltages are between 0V and 1V.

In Example 19, the decoder in Example 14, wherein the decoder comprises arithmetic logic to detect an incoming CHS from a receiver, wherein the logic comprises: logic to read a first ternary voltage vector ($V_{CHS1}$); logic to read a second ternary voltage vector ($V_{CHS2}$); logic to compute a sum of $V_{CHS1}$ and an offset constant ($V_{offset}$); logic to set a first voltage vector ($V_{BIN1}$) to 1 if the sum is greater than a reference constant ($V_{ref}$); logic to set a second voltage vector ($V_{BIN2}$) to 1 if $V_{CHS2}>(V_{CHS1})$ or set to 0 otherwise; logic to set $V_{BIN1}$ to 1 if $V_{CHS2}>V_{ref}$ or set to 0 if the sum is not greater than $V_{ref}$, and logic to output $V_{BIN1}$ and $V_{BIN2}$.

In Example 20, the decoder in Example 14, wherein the decoder is an analog/digital converter-based decoder.

The preceding Description and accompanying Drawings describe examples of embodiments in some detail to aid understanding. However, the scope of protection may also include equivalents, permutations and combinations that are not explicitly described herein. Only the claims appended here (along with those of parent, child or divisional patents, if any) define the limits of the protected intellectual-property rights.

We claim:
1. A link, comprising:
   a crosstalk-harnessed bus having a first differential pair of signal lines;
   a digital transmitter coupled to a first end of the crosstalk-harnessed bus;
   a digital receiver coupled to a second end of the crosstalk-harnessed bus;
   an encoder coupled to an input of the digital transmitter, wherein the encoder comprises arithmetic logic to convert a pair of binary signals to a first pair of ternary signals based on a product of a first voltage vector (V'BIN) representing a binary bit, a weighted matrix, a normalizing factor, and a multiplier; and
   a first decoder logic circuit coupled to an output of the first differential pair of signal lines
   through the digital receiver,
   wherein the first decoder logic circuit comprises a latch for respective ones of the ternary signals, a single comparator for the pair of ternary signals, and a gate.
2. The link of claim 1, wherein the digital transmitter is to transmit the first pair of ternary signals and the digital receiver is to receive the first pair of ternary signals.
3. The link of claim 1, further comprising at least a second pair of ternary signals transmitted in a second pair of differential signal lines; and
   at least a second decoder logic circuit coupled to an additional pair of differential signal lines through the digital receiver;
   wherein the first decoder logic circuit and the second decoder logic circuit work in parallel to convert the first pair of ternary signals and the second pair of ternary signals, respectively, to binary signals.

4. The link of claim 1, further comprising adding an offset to the product of the first voltage vector.

* * * * *